Sept. 6, 1938.  J. P. FURLONG  2,129,269
CONVERSION OF HYDROCARBONS
Filed July 21, 1936   2 Sheets-Sheet 1
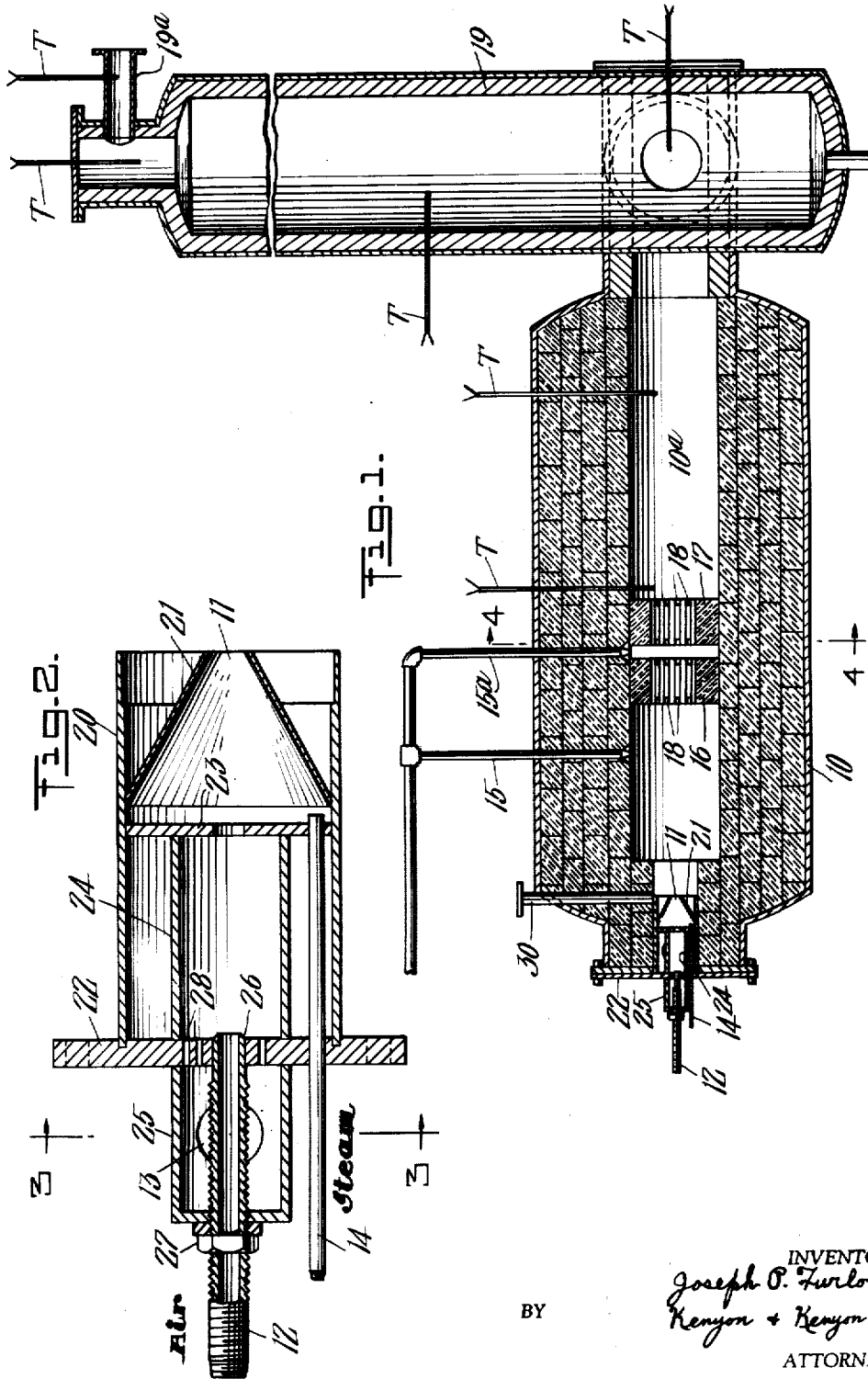
INVENTOR.
Joseph P. Furlong
BY Kenyon & Kenyon
ATTORNEYS.

Sept. 6, 1938. J. P. FURLONG 2,129,269
CONVERSION OF HYDROCARBONS
Filed July 21, 1936 2 Sheets-Sheet 2
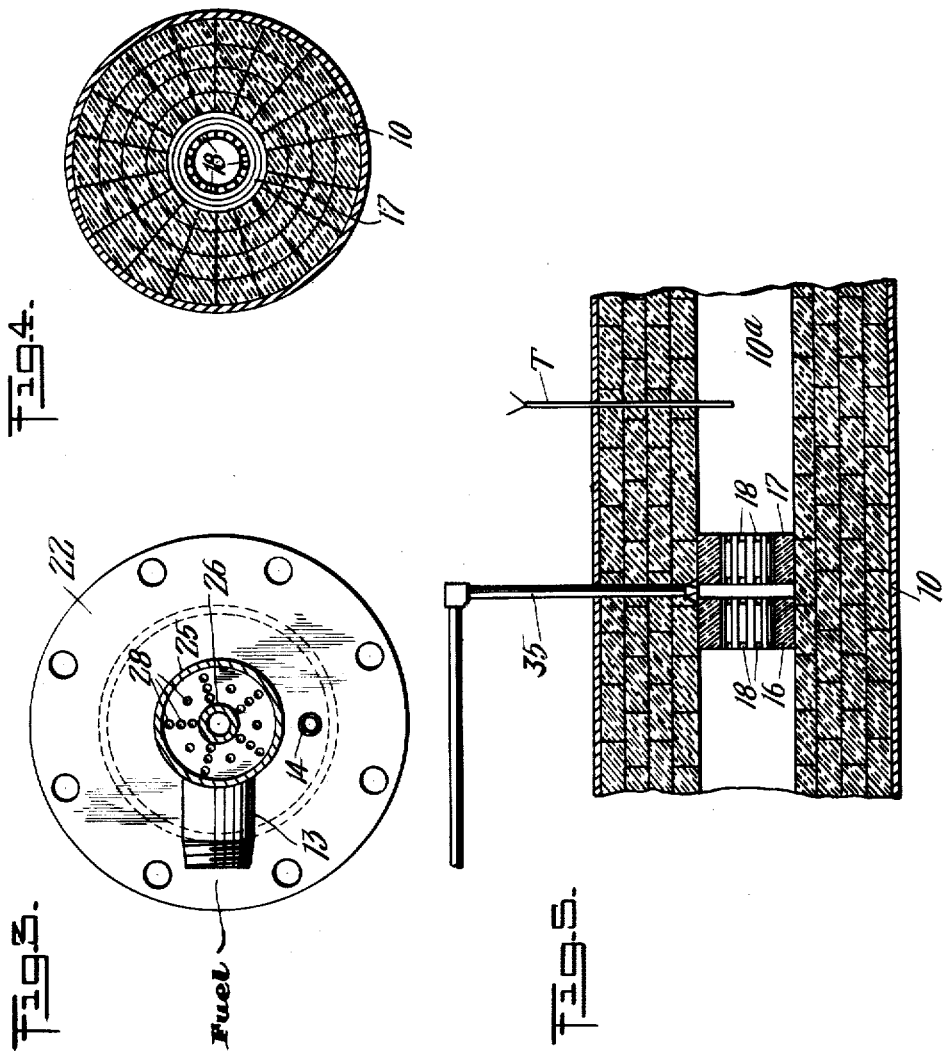
INVENTOR.
Joseph P. Furlong
BY Kenyon & Kenyon
ATTORNEYS.

Patented Sept. 6, 1938

2,129,269

UNITED STATES PATENT OFFICE

2,129,269

CONVERSION OF HYDROCARBONS

Joseph P. Furlong, Jersey City, N. J., assignor to Amarel Corporation, Newark, N. J., a corporation of Delaware Application July 21, 1936, Serial No. 91,668

16 Claims. (Cl. 196—67)

This invention relates to conversion of organic fluids such for example as hydrocarbons, in continuous process.

This invention has as one object the direct admixture of hydrocarbons either as liquids, vapors or mixtures thereof with hot combustion gases to effect the predominant formation either of a fuel gas, a distillate suitable for use as high antiknock motor fuel, paint and varnish solvent, or chemical raw material, or of gases high in constituents of value in synthetic organic chemistry under such circumstances that whatever the primary product may be, a useful and valuable byproduct is also obtained.

Another object of the invention is an improved process for converting organic fluids into gaseous or liquid products of different composition than the original fluid by the direct admixture of the organic fluids with hot combustion gases.

In the conversion of hydrocarbons according to the invention, but oxygen-free gases are produced by effecting combustion of a stoichiometrical mixture of fuel and oxygen at substantially the normal flame temperature of the mixture and for reasons of economy and other practical considerations, air is used to furnish the oxygen for the mixture. Hydrocarbons either in vapor or liquid form or mixtures thereof are contacted with the oxygen-free combustion gases substantially at combustion temperature in the presence of water vapor to react with carbon released from the hydrocarbons to generate fixed gases. In many instances, sufficient water vapor will be provided from the combustion of the fuel and air, but steam may be added to the fuel mixture prior to its combustion to provide the requisite water vapor. The mixture resulting from the contact of hydrocarbons with the hot gases is passed through a reaction zone in which there is a material temperature gradient, due to the endothermic reactions in the mixture and radiation losses, the intermediate temperatures being commensurate with the heat requirements of the desired reactions. The mixture is discharged from the reaction zone without quenching and is supplied to suitable after equipment for separation of gas from liquid.

When fuel gas or the like is the desired predominant product, a portion of the hydrocarbon feed is introduced directly into the combustion zone at a point where combustion of the stoichiometrical mixture of fuel and air is complete, thereby not only mixing hydrocarbons directly with the combustion gases at combustion temperature, but also subjecting such hydrocarbons to the radiant heat from the walls of the combustion chamber. Under such circumstances, $CO_2$ resulting from the combustion of the fuel is largely reduced to CO, thereby increasing the volume of gas as well as diminishing the percentage of inert gas. Also, the $H_2O$ resulting from combustion of the fuel undergoes substantial reaction resulting in the formation of further increments of fixed gases, thereby further increasing the volume of gas made. The remaining portion of the hydrocarbon feed is introduced into the stream of mixed gases and vapors, and is subjected to a lower reaction temperature to effect a milder cracking thereof to produce oil gas of high olefin content for enrichment of the desired gas product.

When a liquid distillate is the desired predominating product, the hydrocarbon feed is contacted with the hot combustion gases in a zone exterior of the combustion zone and shielded from the radiant heat but with the gases substantially at combustion temperature. Substantially all of the heat is thus applied to the cracking of the hydrocarbons and a relatively small portion of the heat is utilized for supplying energy to the reactions involving the reduction of $CO_2$ to CO and the reaction of water to form fixed gases.

In an apparatus for practicing the invention, a cylindrical chamber of refractory ceramic material is provided at one end with a burner for effecting combustion of a mixture of fuel and air and with two or more sets of feed nozzles for introducing hydrocarbons into the chamber, the sets being spaced at different distances from the burner. The chamber discharges into a second heat insulated chamber of a length approximating that of the first chamber. Combustion of the fuel and air takes place ahead of the first set of nozzles and there is a temperature gradient from the locus of the first set of nozzles to the end of the second chamber of from approximately 3400° F. (flame temperature of air and fuel gas) to approximately 1000° F. In a converter for the production of fuel gas, baffle rings of ceramic material are located at either side of the second set of feed nozzles and the first set of feed nozzles discharge the hydrocarbons into the combustion zone at a point where combustion has been completed. That portion of the hydrocarbons fed through the first set of nozzles is subjected to the high temperature of the combustion gases as well as to radiant heat from the walls of the combustion chamber and while undergoing decomposition furnishes material for the reduction of $CO_2$ to CO and reaction of water vapor to fixed gases at a temperature level where these reactions occur at high velocity, and that portion of the hydrocarbons fed through the second set of nozzles into the space between the baffle rings undergoes a milder decomposition resulting in the formation from the oil of a high heating value oil gas which commingles with the gases and vapors resulting from the preceding reactions to form a high heat value gaseous product.

In an apparatus for the predominant production of a liquid distillate, the ceramic baffle rings are arranged at either side of the first set of nozzles so that the hydrocarbon introduced through the first set of nozzles is exterior of the combustion zone but is subjected to the combustion gases substantially at combustion temperature. In such a case, the heat of the combustion gases is substantially all utilized for the cracking of the hydrocarbons and only a relatively small amount of the heat is utilized for causing reduction of $CO_2$ and the reaction of water.

Other objects, novel features and advantages of this invention will become apparent from the following specification and accompanying drawings, wherein:

Fig. 1 is a sectional view through an apparatus for converting hydrocarbons in accordance with the invention;

Fig. 2 is an enlarged sectional view of the burner for effecting combustion of the stoichiometrical mixture of air and fuel;

Fig. 3 is a section substantially on the line 3—3 of Fig. 2;

Fig. 4 is a section substantially on the line 4—4 of Fig. 1; and

Fig. 5 is a fragmentary view similar to Fig. 1 of a modified arrangement of apparatus.

The converter 10 comprises a cylindrical reaction chamber 10a built of refractory and insulating material surrounded by a steel shell capable of holding the pressure and of retaining the gases and vapors. At the left hand end of the chamber is provided a burner 11 for effecting the combustion of a mixture of air and fuel supplied through the pipes 12 and 13 respectively.

A pipe 14 is provided for supplying steam to the mixture of air and fuel, if desired.

The first set of feed nozzles 15 discharge into the converter at a point where complete combustion has been effected of the air and fuel. Beyond the first set of nozzles is provided a second set of nozzles 15a which discharge into a chamber formed by ceramic baffle rings 16 and 17. Although only one nozzle 15 is shown in the drawings, two such nozzles are used, the second nozzle being arranged in the same plane as the first nozzle but being arcuately spaced from the first nozzle. Also, there is a second nozzle 15a which bears the same relation to the first nozzle 15a just described. The passageways through the baffle rings are approximately one-half the diameter of the chamber and around the periphery of the end of each passageway is provided a series of pockets 18 so that the effective area of the passageway is greater at each end than in the middle. These pockets open toward the ends of the passageway and toward the interior thereof and are effective to create substantial turbulence in the gases passing therethrough.

To the exit end of the reaction chamber 10a is connected a second heat insulated chamber 19 which in effect constitutes a continuation of the reaction chamber 10a. From the exit 19a of the second chamber, the mixture of vapors and gases is discharged to an after-equipment in which are effected cooling, washing and other operations to fit the products for marketing.

Thermocouples T are provided in the apparatus at suitable locations for the purpose of determining the temperature existing at various points in the apparatus.

In the operation of this apparatus in the conversion of hydrocarbons to effect predominant formation of a gas product, fuel and oxygen, preferably in the form of air, are supplied to the burner in stoichiometrical proportions and combustion thereof is effected in that portion of the conversion chamber adjacent the burner. The combustion of this mixture is effected at substantially the flame temperature of such mixture and the resulting combustion gases are contacted at substantially combustion temperature with hydrocarbons introduced through the first set of nozzles. The hydrocarbon feed preferably is preheated to any desired temperature. The hydrocarbon feed introduced through these nozzles is not only subjected to direct contact with the hot gases, but is also subjected to radiant heat from the walls of the chamber. The combustion temperature is in the neighborhood of 3400° F. and the temperature conditions existing in the conversion apparatus range from the combustion temperature to a temperature in the neighborhood of 1000° F. at the exit end of the chamber 19.

Complete combustion is effected of the fuel and oxygen in the mixture and the combustion gases with which the hydrocarbons are contacted contain no free oxygen. This eliminates undesirable formation of oxygenated hydrocarbon compounds in the reaction zone. The contact of the hot combustion gases with the hydrocarbons takes place in the presence of water vapor to react with carbon released from the hydrocarbons to generate fixed gases. The water vapor ordinarily is provided in sufficient amount as a by-product of the combustion of the air and fuel, but in the event that this amount of water vapor is insufficient, additional water vapor may be supplied by the introduction of steam through the pipe 14.

In an operation of the process for the production of fuel gas and with baffle rings 16 and 17 arranged as shown in Fig. 1, the procedure was as follows: Gas oil-residuum mixture preheated to enter the converter at 685° F. was charged into the converter at the rate of 66.5 gallons per hour. Fuel gas and air were fed in stoichiometrical proportions to the burner to give oxygen-free gas and at such rate that the flue gas aggregated:

163 lbs. $CO_2$/hr.
101 lbs. $H_2O$/hr.
583 lbs. $N_2$/hr.

The combustion temperature approximated 3400° F. and the temperature of the gases leaving the chamber 19 approximated 1100° F. The whole operation resulted in the formation of a process gas aggregating:

41.6 lbs. $CO_2$/hr.
163 lbs. olefins/hr.
168 lbs. CO/hr.
69.7 lbs. $CH_4$/hr.
6.25 lbs. $H_2$/hr.
583 lbs. $N_2$/hr.

As shown by the figures, a very material reduction of $CO_2$ to CO was effected and a substantial content of olefins provided, thus giving a very efficient fuel gas.

That portion of the hydrocarbon feed which is introduced directly into the combustion zone is exposed to the very high temperatures of all the combustion gases in addition to the radiant heat of the ceramic walls of the combustion chamber. It is thus subjected to a high degree of thermalization and the time-temperature relations are such that $CO_2$ reduction and water reaction to yield fixed gases occur to a very appreciable extent. Reaction of water and $CO_2$ with carbon to form fixed gases of CO and $H_2$ becomes quite slow at about 1650° F. and is almost negligibly slow at lower temperatures. (Haslam and Russell, Fuels and their Combustion, 1927, McGraw Hill, page 158; Morgan "Manufactured Gas," 1926, vol. 1, page 38; U. S. Bureau of Mines Bulletin No. 7, 1911.) In view of the substantial water reaction and $CO_2$ reduction which takes place in the short length of time that the hydrocarbons remain in the combustion zone, the hydrocarbons must be heated in the zone to a temperature in the range of from 1650° F. to 2500° F. the temperature being controllable to some extent by regulation of the rate of feed of the hydrocarbons and by regulation of the ratio between the rate of feed through the two sets of nozzles. That portion of the oil introduced through the feed nozzles 15a is protected from the radiant heat and the excessively high combustion gas temperatures and undergoes a milder reaction upon heat exchange with the vapors and gases flowing from the combustion chamber into the space between the baffle rings 16 and 17. It is thus subjected to temperatures in the range of 1650° F. to 2250° F. and the consequent cracking results in the formation of a rich oil gas which creates heat value to the final gaseous products.

In the use of the above described apparatus for the predominant formation of a liquid product, the baffle rings 16 and 17 are arranged at either side of a set of feed nozzles 35 as illustrated in Fig. 5. Fuel and air in stoichiometrical proportions are supplied to the burner as formerly and the combustion thereof is effected in the space between the end of the chamber and the baffle ring 16. Hydrocarbon feed, preferably preheated to a desired temperature, is introduced into the space between the baffle rings 16 and 17 where it is contacted with hot oxygen-free combustion gases substantially at the combustion temperature of the mixture of air and fuel. The combustion temperature is in the neighborhood of 3400° F. and the hot gases are contacted with the hydrocarbon feed, to such degree that cracking thereof is caused to occur and the temperature of the stream of mixed gases and vapors drops to the order of 1000° F. at the exit from the chamber 19.

In an operation of the process for the predominant production of a liquid product and with the baffle rings 16 and 17 arranged as shown in Fig. 5, the procedure was as follows: Gas oil-residuum mixture (U. G. I. gas oil and fuel oil) preheated to enter the converter at 700° F. was charged into the converter at the rate of 62 gallons per hour. Fuel and air were fed in stoichiometrical proportions to the burner to give oxygen-free gas and at such rate that the flue gas aggregated:

123 lbs. $CO_2$/hr.
1.2 lbs. CO/hr.
99.3 lbs. $H_2O$/hr.
534 lbs. $N_2$/hr.

The combustion temperature approximated 3400° F. and the exit temperature from the chamber 19 approximated 1000° F. The whole operation resulted in the formation of process gas aggregating:

104.1 lbs. $CO_2$/hr.
144 lbs. olefins/hr.
25.3 lbs. CO/hr.
38.7 lbs. $CH_4$/hr.
4.8 lbs. $H_2$/hr.
434 lbs. $N_2$/hr.

In a further operation of the process with the baffle rings 16 and 17 arranged as shown in Fig. 1, the procedure was as follows: East Texas Topped Crude preheated to enter the converter at 540° F. was charged into the converter at the rate of 103.2 gallons per hour. Fuel and air were fed in stoichiometrical proportion to the burner to give oxygen-free gas and at such a rate that the flue gas aggregated 158 lbs. $CO_2$/hr.
130 lbs. $H_2O$/hr.
702 lbs. $N_2$/hr.

The combustion temperature approximated 3400° F. and the exit temperature from the chamber 19 approximated 995° F. The whole operation resulted in the formation of process gas aggregating:

51.4 lbs. $CO_2$/hr.
294.5 lbs. olefins/hr.
156.0 lbs. CO/hr.
89.5 lbs. $CH_4$/hr.
6.2 lbs. $H_2$/hr.
702.0 lbs. $N_2$/hr.

During this operation approximately 55.4 per cent by weight of the oil is converted to gaseous form and the remainder collected as a liquid distillate. Fractions of this liquid are characterized by having a high specific gravity relative to boiling point, indicative of high content of aromatic and unsaturated hydrocarbons. A solvent cut of this liquid distillate boiling in the range of 200° to 400° F. by the A. S. T. M. method aggregated 20% by volume of the total liquid and showed a solvent power for varnish resins considerably better than that of V. M. and P. naphtha and only slightly inferior to that of xylene.

In a still further operation of the process for the production of fuel gas and with the baffle rings 16 and 17 arranged as shown in Fig. 1, the procedure was as follows: Gas oil-residuum mixture was fed at the rate of 134.3 gallons per hour, preheated to enter the converter at approximately 850° F. The combustion temperature was approximately 3400° F. and the exit temperature from the insulated chamber 19 was approximately 955° F. Fuel gas and air were fed in stoichiometrical proportions to give oxygen-free flue gas at such a rate that the flue gas aggregated:

141.4 lbs. $CO_2$/hr.
116.6 lbs. $H_2O$/hr.
628.0 lbs. $N_2$/hr.

The whole operation led to the formation of a process gas aggregating:

42.3 lbs. $CO_2$/hr.
257.6 lbs. olefins/hr.
148.9 lbs. $CO_2$/hr.
112.0 lbs. $CH_4$/hr.
3.9 lbs. $H_2$/hr.
628.0 lbs. $N_2$/hr.

The recovered oil (distillate or ungasified portion of feed oil) is characterized as follows:

Gravity ° A. P. I.=21.9
30% distilled in single distillation at 408° F.,
80% distilled in a single distillation at 578° F.

Unsaturated and aromatic hydrocarbon content of this distillate is very high being on the order of three-fourths (by volume) of the oil in the lighter portions for these two hydrocarbon series.

In the first example of the process, approximately half of the feed was introduced through the nozzles 15 while the remainder was introduced through the nozzles 15a and approximately 5.6 seconds was required for the passage of the stream of mixed hydrocarbon vapors and combustion gases through the reaction zone to the discharge port 19a. In the second example of the process, approximately 5.0 seconds were required for the stream of mixed hydrocarbon vapors and combustion gases to pass through the reaction zone to the discharge port 19a. In the third example of the process, the oil feed was evenly divided between the two sets of nozzles 15 and 15a and approximately 4.8 seconds was required for the hydrocarbon vapors and combustion gases to reach the discharge port 19a. In the fourth example of the process, approximately half of the hydrocarbon feed was introduced through the feed nozzles 15 while the remainder was introduced through the feed nozzles 15a and approximately 4.8 seconds were required for the stream of mixed hydrocarbon vapors and combustion gases to pass through the reaction zone to the discharge port 19a.

The times required for passage of mixed hydrocarbon vapors and combustion gases to the exit from chamber 10a in the three examples were approximately as follows:

Example 1—1.3 seconds
Example 2—1.0 second
Example 3—1.0 second
Example 4—1.0 second The operation of the process may be conducted with a second chamber of less length than illustrated (even zero in some cases) and the times of passage through the chamber 10a may be considered as the lower limit of reaction time while six seconds may be considered as the upper limit of reaction time.

In the apparatus used in making the run given above as examples, the nozzles 15 and 35 are approximately seven and one-half feet from the exit end of the converter shell and approximately twenty feet from the exit 19a. The nozzles 15a are one foot nine inches from the nozzles 15 and 35, respectively, and the baffle rings are nine inches thick and are spaced apart two and one-fourth inches.

The operating conditions of the process may be so regulated as to carry on the process under any desired conditions of pressure, but preferably the process is carried on under a condition of superatmospheric pressure. Also the operating conditions may be so regulated as to control the length of time that the stream of mixed hydrocarbon vapors and combustion gases requires to pass through the conversion zone.

When the water vapor resulting from the combustion of fuel and oxygen is insufficient to prevent the formation of carbon, steam is added in an amount sufficient to supply the necessary water vapor to react with the carbon to generate fixed gases but the amount of steam added is insufficient to cause any substantial temperature reduction of the combustion gases.

As shown in Figs. 2 and 3, the burner consists of a cylindrical shell 20 having a conical nozzle 21. One end of the shell 20 is fastened to a plate 22 which is clamped to the shell of the connector 18 to hold the burner in place. Within the cylindrical shell 20 and to the rear of the conical nozzle 21 is an apertured partition 23 between which and the plate 22 extends a cylindrical housing 24. A similar housing 25 is attached to the plate 22 on the other side thereof and in alignment with the housing 24. The plate 22 has a central aperture through which extends the reduced end 26 of the pipe 12 which is threaded into the end of the housing 25. Lock nuts 27 are provided to lock the pipe in any desired position of adjustment. By rotation of the pipe 12, the position of the end 26 may be adjusted relative to the plate 22. Small holes 28 are provided in the plate 22 leading from the housing 25 to the housing 24 and the pipe 13 leads into the housing 25. Air is supplied through the nozzle 12 to the housing 24 which constitutes a mixing chamber into which gas supplied from the chamber 13 is drawn through the holes 28. The air and fuel are thoroughly mixed in the housing 24 and the mixture is discharged through the aperture in the partition 23 into the nozzle 21 which in turn discharges into the conversion cylinder. The pipe 14 passes through the plate 22, the annular space between the housing 24 and the cylinder 25, and into the nozzle 21 and is used to supply steam to the mixture of fuel and air if steam is required in the conversion process.

A sight tube 30 communicates with the converter near the burner outlet for observing the flame. This tube also provides means for igniting the fuel mixture by introducing a torch therethrough into position to ignite the mixture.

In the passage of the stream of mixed hydrocarbon vapors through the reaction zone there is a steady decrease from the temperature at which the hydrocarbons are heated by contact with the hot combustion gases to the exit temperature without any sudden temperature drop and the stream of mixed hydrocarbon vapors and gases is discharged into the after equipment without quenching.

It is of course understood that various modifications may be made in the structure above disclosed and in the procedure above described without in any way departing from the spirit of the invention as defined in the appended claims.

I claim:

1. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases having carbon oxidizing properties, injecting into said combustion gas stream while at substantially the said normal flame temperature a charging stream composed substantially entirely of hydrocarbons and producing a hydrocarbon-containing mixture heated to a temperature above 1650° F., passing said hydrocarbon-containing mixture through a reaction zone at progressively decreasing temperature and discharging the reaction product from said zone at a temperature in the range between approximately 1000° F. and approximately 1100° F., and maintaining said hydrocarbon-containing mixture above 1650° F. for sufficient time to yield a highly aromatic and olefinic reaction product and to effect oxidation of carbon separated from said hydrocarbons.

2. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases containing $H_2O$ and $CO_2$, injecting into said combustion gas stream while at substantially the said normal flame temperature a charging stream composed substantially entirely of hydrocarbons and producing a hydrocarbon-containing mixture heated to a temperature above 1650° F., passing said hydrocarbon-containing mixture through a reaction zone at progressively decreasing temperature and discharging the reaction product from said zone at a temperature in the range between approximately 1000° F. and approximately 1100° F., and maintaining said hydrocarbon-containing mixture above 1650° F. for sufficient time to yield a highly aromatic and olefinic reaction product and to effect reaction of said $H_2O$ and $CO_2$ with carbon separated from said hydrocarbons.

3. The process of converting hydrocarbons which comprises continuously supplying a combustible stream containing a stoichiometrical mixture of fuel and oxygen to a first zone, effecting combustion of said stream in said zone substantially at the normal flame temperature of said stoichiometrical mixture to produce a continuous stream of oxygen-free gases having carbon oxidizing properties, injecting into said combustion gas stream in a second zone while substantially at the said normal flame temperature a charging stream composed substantially entirely of hydrocarbons thereby producing a hydrocarbon-containing mixture heated to a temperature above 1650° F., passing said hydrocarbon-containing mixture through a third zone at progressively decreasing temperature and discharging the reaction product from said third zone at a temperature in the range between approximately 1000° F. and approximately 1100° F. and maintaining said hydrocarbon-containing mixture above 1650° F. for sufficient time to yield a highly aromatic and olefinic reaction product and to effect oxidation of carbon separated from said hydrocarbons.

4. The process of converting hydrocarbons which comprises continuously supplying a combustible stream containing a stoichiometrical mixture of fuel and oxygen to a first zone, effecting combustion of said stream in said zone substantially at the normal flame temperature of said stoichiometrical mixture to produce a continuous stream of oxygen-free gases containing $H_2O$ and $CO_2$, injecting into said combustion gas stream in a second zone and while substantially at the said normal flame temperature a charging stream composed substantially entirely of hydrocarbons thereby producing a hydrocarbon-containing mixture heated to a temperature above 1650° F., passing said hydrocarbon-containing mixture through a third zone at progressively decreasing temperature and discharging the reaction product from said third zone at a temperature in the range between approximately 1000° F. and approximately 1100° F., and maintaining said hydrocarbon-containing mixture above 1650° F. for sufficient time to yield a highly aromatic and olefinic reaction product and to effect reaction of said $H_2O$ and $CO_2$ with carbon separated from said hydrocarbons.

5. The process of converting hydrocarbons which comprises continuously supplying a combustible stream containing a stoichiometrical mixture of fuel and oxygen to a first zone, effecting combustion of said stream in said zone substantially at the normal flame temperature of said stoichiometrical mixture to produce a continuous stream of oxygen-free gases having carbon oxidizing properties, passing said combustion gas stream through a restricted passage into a second zone at substantially the said normal flame temperature, injecting into said second zone a charging stream composed substantially entirely of hydrocarbons and producing a hydrocarbon-containing mixture heated to a temperature above 1650° F., passing said hydrocarbon-containing mixture through a restricted passage into a third zone and through said third zone at progressively decreasing temperature, discharging the reaction product from said third zone at a temperature in the range between approximately 1000° F. and approximately 1100° F., and maintaining said hydrocarbon-containing mixture above 1650° F. for sufficient time to yield a highly aromatic and olefinic reaction product and to effect oxidation of carbon separated from said hydrocarbons.

6. The process of converting hydrocarbons which comprises continuously supplying a combustible stream containing a stoichiometrical mixture of fuel and oxygen to a first zone, effecting combustion of said stream in said zone substantially at the normal flame temperature of said stoichiometrical mixture to produce a continuous stream of oxygen-free gases containing $H_2O$ and $CO_2$, passing said combustion gas stream through a restricted passage into a second zone at substantially the said normal flame temperature, injecting into said second zone a charging stream composed substantially entirely of hydrocarbons and producing a hydrocarbon-containing mixture heated to a temperature above 1650° F., passing said hydrocarbon-containing mixture through a restricted passage into a third zone through said third zone and at progressively decreasing temperature, discharging the reaction product from said third zone at a temperature in the range between approximately 1000° F. and approximately 1100° F., and maintaining said hydrocarbon-containing mixture above 1650° F. for sufficient time to yield a highly aromatic and olefinic reaction product and to effect reaction of said $H_2O$ and $CO_2$ with carbon separated from said hydrocarbons.

7. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases having carbon oxidizing properties, dividing into two branches a charging stream composed substantially entirely of hydrocarbons, continuously injecting one branch of said charging stream into said combustion gas stream while at substantially said flame temperature and in the presence of radiant heat to produce a first hydrocarbon-containing mixture heated to a temperature above 1650° F., continuously injecting the second branch of said charging stream into said first hydrocarbon-containing mixture, passing the resulting second hydrocarbon-containing mixture through a reaction zone at progressively decreasing temperature and discharging the reaction product from said zone at a temperature in the range between approximately 1000° F. and approximately 1100° F., and maintaining said first hydrocarbon-containing mixture above 1650° F. for sufficient time to yield a highly aromatic and olefinic reaction product and to effect oxidation of carbon separated from said hydrocarbons.

8. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases containing $H_2O$ and $CO_2$, dividing into two branches a charging stream composed substantially entirely of hydrocarbons, continuously injecting one branch of said charging stream into said combustion gas stream while substantially at said flame temperature and in the presence of radiant heat to produce a first hydrocarbon-containing mixture heated to a temperature above 1650° F., continuously injecting the second branch of said charging stream into said first hydrocarbon-containing mixture, passing the resulting second hydrocarbon-containing mixture through a reaction zone at progressively decreasing temperature and discharging the reaction product from said zone at a temperature in the range between approximately 1000° F. and approximately 1100° F., and maintaining said first hydrocarbon-containing mixture above 1650° F. for sufficient time to yield a highly aromatic and olefinic reaction product and to effect reaction of said $H_2O$ and said $CO_2$ with carbon separated from said hydrocarbons.

9. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases having carbon oxidizing properties, dividing into two branches a charging stream composed substantially entirely of hydrocarbons, continuously injecting one branch of said charging stream into said combustion gas stream in a first zone while substantially at said normal flame temperature and in the presence of radiant heat to produce a first hydrocarbon-containing mixture heated to a temperature above 1650° F., maintaining said first hydrocarbon-containing mixture above 1650° F. in said first zone for sufficient time to effect oxidation of carbon separated from said hydrocarbons and material reduction of $CO_2$ in the combustion gases, flowing said first hydrocarbon-containing mixture into a second zone, continuously injecting the second branch of said charging stream into said hydrocarbon-containing mixture in said second zone, flowing the resulting second hydrocarbon-containing mixture into and through a third zone at progressively decreasing temperature, and discharging the reaction product from said third zone at a temperature in the range between approximately 1000° F. and approximately 1100° F.

10. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases containing $H_2O$ and $CO_2$, dividing into two branches a charging stream composed substantially entirely of hydrocarbons, continuously injecting one branch of said charging stream into said combustion gas stream in a first zone while substantially at said normal flame temperature and in the presence of radiant heat to produce a first hydrocarbon-containing mixture heated to a temperature above 1650° F., maintaining said first hydrocarbon-containing mixture above 1650° F. in said first zone for sufficient time to effect reaction of said $H_2O$ and $CO_2$ with carbon separated from said hydrocarbons and material reduction of $CO_2$ in said combustion gas, flowing said first hydrocarbon-containing mixture into a second zone, continuously injecting the second branch of said charging stream into said hydrocarbon-containing mixture in said second zone, flowing the resulting second hydrocarbon-containing mixture into and through a third zone at progressively decreasing temperature, and discharging the reaction product from said third zone at a temperature in the range between approximately 1000° F. and approximately 1100° F.

11. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases having carbon oxidizing properties, dividing into two branches a charging stream composed substantially entirely of hydrocarbons, continuously injecting one branch of said charging stream into said combustion gas stream in a first zone while substantially at said flame temperature and in the presence of radiant heat to produce a first hydrocarbon-containing mixture heated to a temperature above 1650° F., passing said first hydrocarbon-containing mixture through a restricted passage into a second zone, continuously injecting the second branch of said charging stream into said second zone, flowing the resulting second hydrocarbon-containing mixture through a restricted passage into and through a third zone at progressively decreasing temperature, discharging the reaction product from said third zone at a temperature in the range between approximately 1000° F. and approximately 1100° F., and maintaining said first hydrocarbon-containing mixture in said first zone above 1650° F. for sufficient time to yield a highly aromatic and olefinic reaction product and to effect oxidation of carbon separated from said hydrocarbons with material reduction of $CO_2$ in said combustion gas.

12. The process of converting hydrocarbons which comprises continuously supplying a combustible stream containing a stoichiometrical mixture of fuel and oxygen, effecting combustion of said stream substantially at the normal flame temperature of said stoichiometrical mixture to produce a continuous stream of oxygen-free combustion gases containing $H_2O$ and $CO_2$, dividing into two branches a charging stream composed substantially entirely of hydrocarbons, continuously injecting one branch of said charging stream into said combustion gas stream in a first zone while substantially at said normal flame temperature and in the presence of radiant heat to produce a first hydrocarbon-containing mixture heated to a temperature above 1650° F., passing said first hydrocarbon-containing mixture through a restricted passage into a second zone, continuously injecting the second branch of said charging stream into said second zone, flowing the resulting second hydrocarbon-containing mixture through a restricted passage into and through a third zone at progressively decreasing temperature, discharging the reaction product from said third zone at a temperature in the range between approximately 1000° F. and approximately 1100° F., and maintaining said first hydrocarbon-containing mixture in said first zone above 1650° F. for sufficient time to yield a highly aromatic and olefinic reaction product and to effect reaction of said $H_2O$ and $CO_2$ with carbon separated from said hydrocarbons with material reduction of $CO_2$ in said combustion gas.

13. The process according to claim 1 wherein steam is added to said combustible stream merely in sufficient quantity completely to effect reaction of carbon separated from said hydrocarbons to form fixed gases.

14. The process according to claim 2 wherein steam is added to said combustible stream merely in sufficient quantity completely to effect reaction of carbon separated from said hydrocarbons to form fixed gases.

15. The process according to claim 7 wherein steam is added to said combustible stream merely in sufficient quantity completely to effect reaction of carbon separated from said hydrocarbons to form fixed gases.

16. The process according to claim 8 wherein steam is added to said combustible stream merely in sufficient quantity completely to effect reaction of carbon separated from said hydrocarbons to form fixed gases.

JOSEPH P. FURLONG.

CERTIFICATE OF CORRECTION.

Patent No. 2,129,269. September 6, 1938.

JOSEPH P. FURLONG.

It is hereby certified that error appears in the printed specification of the above numbered patent requiring correction as follows: Page 1, first column, line 21, for the word "but" read hot; page 4, first column, line 58, strike out the words and comma "and 35, respectively,"; page 5, second column, line 49, claim 6, strike out "and" and insert the same after "zone" in line 48, same claim; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.

temperature and in the presence of radiant heat to produce a first hydrocarbon-containing mixture heated to a temperature above 1650° F., passing said first hydrocarbon-containing mixture through a restricted passage into a second zone, continuously injecting the second branch of said charging stream into said second zone, flowing the resulting second hydrocarbon-containing mixture through a restricted passage into and through a third zone at progressively decreasing temperature, discharging the reaction product from said third zone at a temperature in the range between approximately 1000° F. and approximately 1100° F., and maintaining said first hydrocarbon-containing mixture in said first zone above 1650° F. for sufficient time to yield a highly aromatic and olefinic reaction product and to effect reaction of said $H_2O$ and $CO_2$ with carbon separated from said hydrocarbons with material reduction of $CO_2$ in said combustion gas.

13. The process according to claim 1 wherein steam is added to said combustible stream merely in sufficient quantity completely to effect reaction of carbon separated from said hydrocarbons to form fixed gases.

14. The process according to claim 2 wherein steam is added to said combustible stream merely in sufficient quantity completely to effect reaction of carbon separated from said hydrocarbons to form fixed gases.

15. The process according to claim 7 wherein steam is added to said combustible stream merely in sufficient quantity completely to effect reaction of carbon separated from said hydrocarbons to form fixed gases.

16. The process according to claim 8 wherein steam is added to said combustible stream merely in sufficient quantity completely to effect reaction of carbon separated from said hydrocarbons to form fixed gases.

JOSEPH P. FURLONG.

CERTIFICATE OF CORRECTION.

Patent No. 2,129,269.  September 6, 1938.

JOSEPH P. FURLONG.

It is hereby certified that error appears in the printed specification of the above numbered patent requiring correction as follows: Page 1, first column, line 21, for the word "but" read hot; page 4, first column, line 58, strike out the words and comma "and 35, respectively,"; page 5, second column, line 49, claim 6, strike out "and" and insert the same after "zone" in line 48, same claim; and that the said Letters Patent should be read with this correction therein that the same may conform to the record of the case in the Patent Office.

Signed and sealed this 25th day of October, A. D. 1938.

Henry Van Arsdale (Seal)  Acting Commissioner of Patents.